Patented June 26, 1945

2,379,036

UNITED STATES PATENT OFFICE 2,379,036

CELLULOSE ACETATE COMPOSITION

Frank E. Piech, Sayreville, N. J., assignor to Hercules Powder Company, Wilmington, Del., a corporation of Delaware No Drawing. Application November 26, 1942, Serial No. 467,060

10 Claims. (Cl. 106—179)

This invention relates to compositions of matter in which cellulose acetate is combined with other substances such as compatible plasticizers and, more particularly, to compositions of matter in which cellulose acetate is combined on mixing with a solvent plasticizer and certain phenoxy ethanols.

It is well known that in the production of sheets, films, molding powder, molded products, varnishes, lacquers, etc., it is necessary to combine or mix cellulose acetate with certain plasticizers in order to obtain products of desirable hardness, flexibility, etc. Particularly in the molding of articles, it is desirable that plasticizers be added to lower the temperature at which the cellulose acetate may be molded as well as to produce a product which is non-brittle.

There are a large number of desirable plasticizers known to the art for the purpose of plasticizing cellulose acetate compositions but many of them are expensive or not obtainable under wartime conditions. Dimethyl phthalate has been found particularly desirable as a plasticizer for cellulose acetate but a relatively large amount of it is required to plasticize properly and the material is not always obtainable.

Now, in accordance with the present invention, it has been discovered that cellulose acetate may be desirably plasticized by the use of para-tertiary phenoxy ethanols admixed with other solvent plasticizers. In this manner, these phenoxy ethanols may be substituted for a part of the solvent plasticizer formerly used.

The following are examples of methods of carrying out this invention:

Example 1

Seventy-two parts of cellulose acetate having an acetic acid content of from 52.5 to 53.5% and a viscosity of from 30 to 60 seconds were colloided with 14 parts of para-tertiary amyl phenoxy ethanol and 14 parts of dimethyl phthalate. The material was cast in the form of a sheet which had desirable plastic properties.

Example 2

Sixty-nine parts of cellulose acetate having an acetic acid content of from 52.5 to 53.5% and a viscosity of from 30 to 60 seconds were colloided with 15.5 parts of para-tertiary amyl phenoxy ethanol and 15.5 parts of dimethyl phthalate in the presence of an 80-20 acetone-alcohol mixture. The composition was milled, cut into molding powder, dried free of solvent and molded in the form of a comb. The product had a hardness, Rockwell "M" of 62 and was flexible.

Example 3

Sixty-nine parts of cellulose acetate having an acetic acid content between 55.5 and 56.2% and a viscosity of from 35 to 55 seconds were mixed with 15.5 parts of para-tertiary amyl phenoxy ethanol and 15.5 parts of dimethyl phthalate. The mixture was cast in the form of a sheet which was found to be flexible.

Example 4

Sixty-nine parts of cellulose acetate having an acetic acid content of from 52.5 to 53.5% and a viscosity of from 30 to 60 seconds were mixed with 15.5 parts of para-tertiary butyl phenoxy ethanol and 15.5 parts of dimethyl phthalate. The mixture was colloided using an 80-20 acetone-alcohol solvent. The colloided material was extruded and cut into the form of molding powder. The molding powder was molded under increased temperature and pressure in the form of a comb which had a hardness Rockwell "M" of 65 and was flexible.

Example 5

Sixty-nine parts of cellulose acetate having an acetic acid content of from 56.5 to 57.5% and a viscosity of 140 to 150 seconds were mixed with 15.5 parts of para-tertiary butyl phenoxy ethanol and 15.5 parts of dimethyl phthalate. The mixture was cast in the form of a sheet which was flexible.

Example 6

Sixty-nine parts of cellulose acetate having an acetic acid content of from 52.5 to 53.5% and a viscosity of from 30 to 60 seconds were colloided with 15.5 parts of para-tertiary butyl phenoxy ethanol acetate and 15.5 parts of dimethyl phthalate. The colloiding took place in the presence of an 80-20 mix of acetone-alcohol as a solvent. The colloided mixture was processed in the form of molding powder. The molding powder was molded under increased temperature and pressure in the form of a comb which had a hardness, Rockwell "M" of 62 and had desirable flexibility.

Those para-tertiary alkyl phenoxy ethanols which have been found particularly useful in this invention include para-tertiary amyl phenoxy ethanol, para-tertiary butyl phenoxyl ethanol, and the ester, para-tertiary butyl phenoxy ethanol acetate.

Various types of solvent plasticizers are known and those which have been found particularly useful include dibutyl tartrate, diethyl phthalate, ethyl p-toluene sulfonamid, methyl phthalyl ethyl glycollate, methyl cellosolve phthalate, triacetin, and tributyl phosphate.

The para-tertiary alkyl phenoxy ethanols in combination with a solvent plasticizer have been found useful with a wide range of acetic acid content cellulose acetate but, in general, have been found particularly useful in the range of 52% to 57% acetic acid content when the product is to be a plastic and from 55% to 57% acetic acid content when the product is a film. The viscosity ranges of the cellulose acetate may vary but, in general, will fall between 20 and 140 seconds.

The relationship between the para-tertiary alkyl phenoxy ethanol and the solvent plasticizer may be varied over a wide range but a relationship of 1 part of solvent plasticizer, such as dimethyl phthalate, to 1 part of the para-tertiary alkyl phenoxy ethanol has been found most desirable. For best results, 1 part of solvent plasticizer to not more than 3 parts phenoxy ethanol should be used.

The total percentage of plasticizer to cellulose acetate may also be varied widely depending on the product that is to be manufactured but, in general, a content of from 30 to 60% of plasticizer will be used in the forming of plastic molded articles.

While the invention lies in the use of a solvent plasticizer with a para-tertiary alkyl phenoxy ethanol other ingredients ordinarily used in plastic compositions may be used, such as fillers, pigments, dyes, stabilizers, etc.

The herein described compositions of matter may be used to form sheets or films or coating compositions, including varnishes and lacquers, or molded products, such as buttons, combs, electric plugs, fountain pens, telephone equipment, etc.

Thus, the present invention has described a new and useful cellulose acetate composition in which certain phenoxy ethanols may be substituted for a part of the solvent plasticizers formerly used. The composition has good flow at molding temperatures and desirable hardness at ordinary temperatures but nonbrittle.

What I claim and desire to protect by Letters Patent is:

1. A plastic composition comprising from about 40% to about 70% by weight of cellulose acetate and from about 60% to about 30% by weight of total plasticizer, said plasticizer consisting essentially of a p-tertiary alkyl phenoxy ethanol and a solvent plasticizer in the weight ratio of not more than 3:1.

2. A plastic composition comprising from about 40% to about 70% by weight of cellulose acetate and from about 60% to about 30% by weight of total plasticizer, said plasticizer consisting essentially of p-tertiary butyl phenoxy ethanol and a solvent plasticizer in the weight ratio of not more than 3:1.

3. A plastic composition comprising from about 40% to about 70% by weight of cellulose acetate and from about 60% to about 30% by weight of total plasticizer, said plasticizer consisting essentially of p-tertiary amyl phenoxy ethanol and a solvent plasticizer in the weight ratio of not more than 3:1.

4. A plastic composition comprising from about 40% to about 70% by weight of cellulose acetate and from about 60% to about 30% by weight of total plasticizer, said plasticizer consisting essentially of a p-tertiary alkyl phenoxy ethanol and dimethyl phthalate in the weight ratio of not more than 3:1.

5. A plastic composition comprising from about 40% to about 70% by weight of cellulose acetate having an acetic acid content of from about 52% to about 57% and from about 60% to about 30% by weight of total plasticizer, said total plasticizer consisting essentially of a p-tertiary alkyl phenoxy ethanol and a solvent plasticizer in the weight ratio of not more than 3:1.

6. A molded article comprising from about 40% to about 70% by weight of cellulose acetate and from about 60% to about 30% by weight of total plasticizer, said plasticizer consisting essentially of a p-tertiary alkyl phenoxy ethanol and a solvent plasticizer in the weight ratio of not more than 3:1.

7. A plastic composition comprising from about 40% to about 70% by weight of cellulose acetate and from about 60% to about 30% by weight of total plasticizer, said plasticizer consisting essentially of p-tertiary butyl phenoxy ethyl acetate and a solvent plasticizer in the weight ratio of not more than 3:1.

8. A plastic composition comprising from about 40% to about 70% by weight of cellulose acetate, from about 60% to about 30% by weight of total plasticizer, a pigment and a stabilizer, said total plasticizer consisting essentially of a p-tertiary alkyl phenoxy ethanol and a solvent plasticizer in the weight ratio of not more than 3:1.

9. A plastic composition comprising from about 40% to about 70% by weight of cellulose acetate, from about 60% to about 30% by weight of total plasticizer and a dye, said total plasticizer consisting essentially of a p-tertiary alkyl phenoxy ethanol and a solvent plasticizer in the weight ratio of not more than 3:1.

10. A plastic composition comprising from about 40% to about 70% by weight of cellulose acetate and from about 60% to about 30% by weight of total plasticizer, said plasticizer consisting essentially of a material selected from the group consisting of p-tertiary alkyl phenoxy ethanols and p-tertiary alkyl phenoxy ethyl acetates and a solvent plasticizer in the weight ratio of not more than 3:1.

FRANK E. PIECH.